United States Patent [19]

Hanway et al.

[11] Patent Number: 5,081,591
[45] Date of Patent: Jan. 14, 1992

[54] OPTIMIZING REACTIVE POWER DISTRIBUTION IN AN INDUSTRIAL POWER NETWORK

[75] Inventors: James E. Hanway, Rochester, N.Y.; Richard E. Putman, Oakmont, Pa.

[73] Assignee: Westinghouse Electric Corp., Pittsburgh, Pa.

[21] Appl. No.: 489,054

[22] Filed: Feb. 28, 1990

[51] Int. Cl.$^5$ .......................... H02J 3/18; G05F 1/70
[52] U.S. Cl. ................................ 364/485; 364/483; 364/492; 323/205
[58] Field of Search ............... 364/495, 494, 493, 492, 364/578, 148, 149, 150, 464.04, 483; 324/103 R, 116, 113, 157; 60/676; 322/47; 323/205, 206, 207, 208, 209, 210, 211

[56] References Cited

U.S. PATENT DOCUMENTS

| | | | |
|---|---|---|---|
| 4,236,108 | 11/1980 | Stemmler | 323/114 |
| 4,356,440 | 10/1982 | Curtiss et al. | 323/210 |
| 4,417,194 | 11/1983 | Curtiss et al. | 322/47 |
| 4,607,325 | 8/1986 | Horn | 364/151 |
| 4,628,462 | 12/1986 | Putman | 364/494 |
| 4,663,703 | 5/1987 | Axelby et al. | 364/149 |
| 4,672,298 | 6/1987 | Rohatyn | 323/208 |
| 4,745,758 | 5/1988 | Putman et al. | 60/676 |
| 4,805,114 | 2/1989 | Putman et al. | 364/494 |
| 4,876,497 | 10/1989 | Colver | 323/211 |
| 4,912,624 | 3/1990 | Harth et al. | 364/156 |
| 4,916,377 | 4/1990 | Terada et al. | 323/210 |
| 4,935,886 | 6/1990 | Choka | 364/578 |
| 4,999,565 | 3/1991 | Nilsson | 323/210 |

OTHER PUBLICATIONS

Stevenson, Jr., William D., *Elements of Power System Analysis*, McGraw-Hill Book Co., fourth edition, 1982, Section 6.11 and Chapter 8.

Box, G. E. P. and J. S. Hunter, "Evolutionary Operation: A Method for Increasing Industrial Productivity", *Applied Statistics*, vol. VI, No. 2, 1957, pp. 3-23.

Box, G. E. P. and J. S. Hunter, "Condensed Calculations for Evolutionary Operation Programs", *Technometrics*, vol. 1, No. 1, 1959, pp. 77-91.

Sweeney, B. C., "Process Improvement with Simplex Self-Directing Evolutionary Operation", *Chemical Engineering*, Jul. 5, 1965, pp. 117-126.

*Primary Examiner*—Kevin J. Teska
*Assistant Examiner*—Collin W. Park

[57] ABSTRACT

A system and method for optimizing the costs associated with the generation and flow of reactive power in an industrial plant connected to receive power from an electrical power utility and including a plurality of electromechanical rotating machines and electrical loads connected in a network, each machine having a reactive power characteristic and an excitation element which is controllable for adjusting the reactive power generated or absorbed by the machine. Control is achieved by: creating a model of the network for providing an indication of the reactive power to be supplied by the utility in dependence on representations of selected network electrical parameters including the reactive power generated or absorbed by each machine; providing an indication of the cost associate with reactive power flow as represented by the model; providing to the model sets of representations of altered values of reactive power generated or absorbed by each machine and causing the model to produce an indication for each set of representations; determining the lowest cost indication provided after the model has provided indications relating to a plurality of different sets of representations provided to the model; and providing an indication of the control to be effected on the excitation element of each machine to produce or absorb the amount of reactive power indicated by the model with respect to the set of representations for which the lowest cost indication is produced in the determining step.

10 Claims, 4 Drawing Sheets

OPTIMIZING REACTIVE POWER DISTRIBUTION IN AN INDUSTRIAL POWER NETWORK

BACKGROUND OF THE INVENTION

The present invention relates to control of industrial power networks of the type including a plurality of generators and one or more motors, and connected to receive additional power from a utility.

In industrial systems of this type, it is the usual practice to adjust the real power produced by each generator in order to optimize the real power generation assignments of the system. The reactive power to be produced by each generator and each motor is determined individually for each machine in accordance with the operating characteristics of that machine and the loads connected to the same bus as that machine. However, because of the power flows within the network, it will frequently occur that the distribution of reactive power within the network will not be optimum, with the result that reactive power will be drawn from the utility, resulting in the assessment of a reactive power consumption penalty by the utility.

In addition, the system operating cost is influenced by deviations of load bus voltages from their assigned values and by operation of a transformer beyond its rated capacity or operation of a machine outside of its reactive capability.

SUMMARY OF THE INVENTION

It is a primary object of the present invention to optimize the reactive power generation assignments within such a system.

A further object of the invention is to minimize the reactive power drawn from an external utility.

An additional object is to balance the reactive power flows within the system.

Further objects of the invention are to control the generation of reactive power within such a system in a manner to maintain all machines within their reactive capability, maintain all transformers within their rated capacity and the tap changers of such transformers within their operating ranges, and to maintain all load bus voltages within assigned tolerances.

The above and other objects are achieved, according to the present invention, with a system for optimizing the costs associated with the generation and flow of reactive power in an industrial plant connected to receive power from an electrical power utility and including a plurality of electromechanical rotating machines and electrical loads connected in a network, each machine having a reactive power characteristic and an excitation element which is controllable for adjusting the reactive power generated or absorbed by the machine, said system comprising:

means defining a model of the network for providing an indication of the reactive power to be supplied by the utility in dependence on representations of selected network electrical parameters including the reactive power generated or absorbed by each machine;

cost determining means connected to said means defining a model for providing an indication of the cost associated with reactive power flow as represented by the model;

network model parameter perturbing means connected to said model means for providing to said model means sets of representations of altered values of reactive power generated or absorbed by each machine;

comparison means connected to said cost determining means for determining the lowest cost indication provided by said cost determining means after said model means have provided indications relating to a plurality of sets of representations provided by said perturbing means; and machine control means connected to said comparison means for providing an indication of the control to be effected on the excitation element of each machine to produce or absorb the amount of reactive power indicated by said model means with respect to the set of representations for which the lowest cost indication is produced by said cost determining means.

The method and system according to the present invention provide optimal control of reactive power generation and the setting of transformer taps for a network in which the real power assignments have already been fixed.

The Newton-Raphson method is used to solve a model of the system. For this purpose, selected values are supplied for the voltage magnitude to be maintained at the reference bus, which is connected to the utility, the real and reactive power levels supplied by the electrical power utility and by each machine, the real and reactive power loads on all load buses, the status of all interbus breakers, the impedance or admittance of all lines, the reactive capability characteristic, or curve, for each machine, the maximum complex power capacity of each transformer, the tap changer transformation ratio range of each transformer, and the allowable voltage range of each bus. A matrix of equations, each relating to a respective bus, is solved by an interactive procedure until all equations balance. During this solution, the values which can vary are the reactive power level at the reference bus, normally the bus connected to the electrical power utility, the reactive power set point for each machine, the transformer transformation ratios and the voltages on all buses, all being held within the specified ranges.

Once a solution has been reached, the reactive power values and the transformer tap settings are then perturbed according to a modified simplex self-directing evolutionary operation and the model is again solved to determine the bus voltages which will exist under the perturbed conditions. Based on a user-entered set of weighted cost criteria, the optimum solution resulting in minimum cost is determined. When the optimum solution, or the best attainable solution, has been derived, indications of the associated reactive power values and transformer tap settings are provided.

Based on the known reactive capability characteristics of the individual machines, the determined reactive power values are used to adjust the excitation current to each machine, or at least each machine presently under reactive power, or VAR, control, to establish the desired reactive power set points. The transformer taps are set in accordance with the tap setting indications produced by the system.

The procedure according to the present invention can be employed either on-line or off-line. In off-line operation, the user can simulate various sets of conditions and optimize the reactive power generation assignments and transformer tap settings with respect to selected cost criteria for each such set of conditions. This allows the user to experiment with different cost criteria and weighting factors, perturbation magnitudes, etc., to determine the set of values which provides the optimum performance for the system under the various simulated conditions. The entire system can be implemented by a general purpose computer.

For on-line operation, the optimizing system is provided with data identifying the current real power assignments and transformer transformation ratios, as well as initial reactive power assignments for each machine, the present status of all switches and circuit breakers of the plant network and machine characteristic curves. Based on this information, a model of the system based on a Newton-Raphson matrix provides the values for the corresponding bus voltages, the reactive power set points for each machine and the transformation ratio and tap changer position for each transformer.

Detected values provided by the matrix are then treated as variables which are subjected to an ordered set of perturbations, as mentioned above, and for each set of perturbations, new output values are produced, using a Newton-Raphson matrix model of the system, and the total cost based on the values provided by the model is computed. The costs associated with various sets of perturbed values are compared, new sets of perturbed variables are provided and the cost comparisons are reiterated until a solution approximating the lowest total cost is achieved.

During these operations, the optimizing system acts to maintain all machines within their reactive capability, all transformers within their rated capacity, all tap changers within their operating ranges and all bus voltages within assigned tolerances. This is achieved by supplying the optimizing system with data regarding these characteristics and limiting the corresponding variable values accordingly.

DESCRIPTION OF THE PREFERRED EMBODIMENTS

Figure 1:
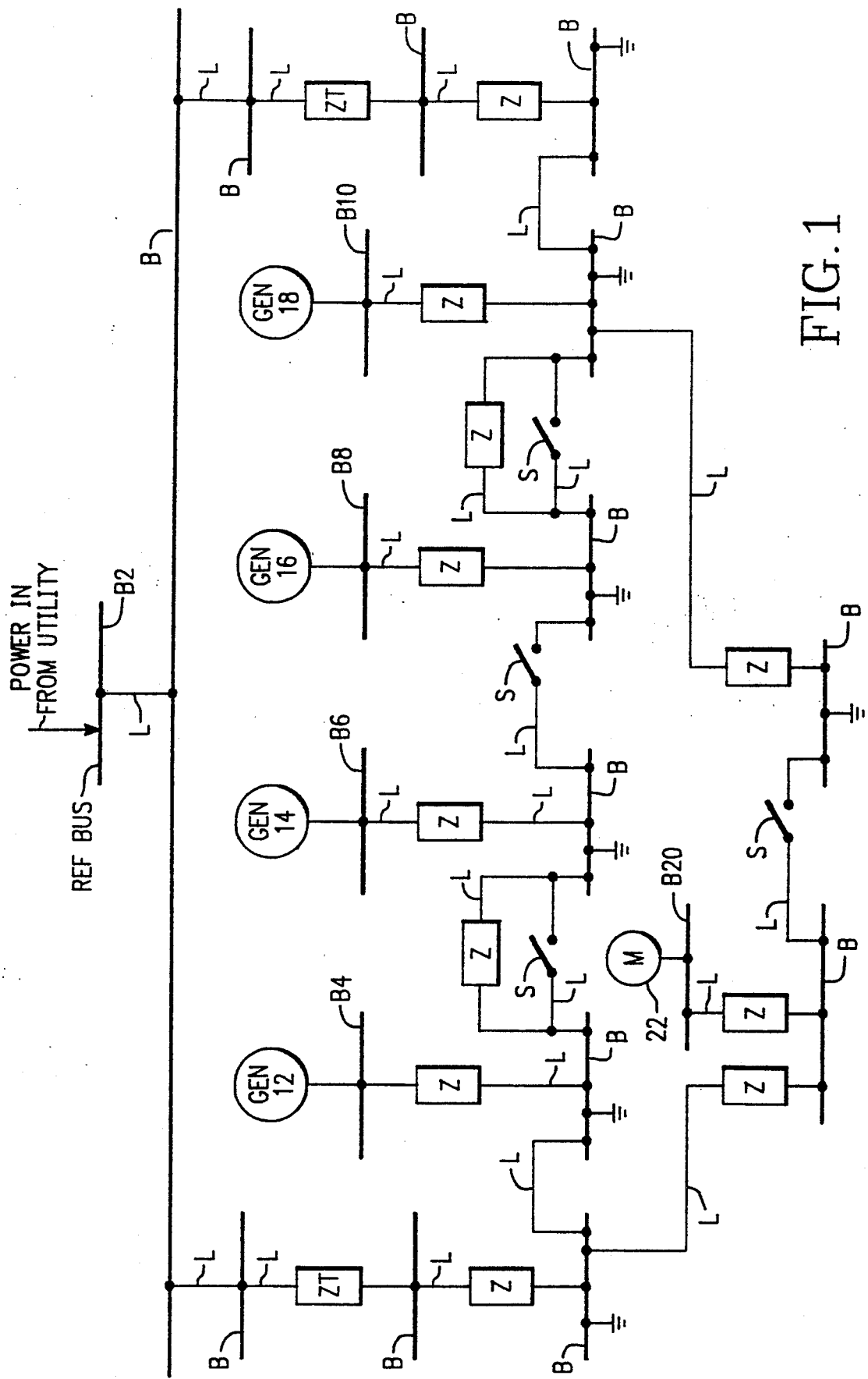
FIG. 1 is a simplified schematic diagram of a plant network whose economic operation can be optimized according to the invention.

FIG. 1 is a simplified one-line diagram of an exemplary plant network to which the present invention may be applied. The fundamentals of one-line diagrams are described in section 6.11 of the text *ELEMENTS OF POWER SYSTEM ANALYSIS*, fourth edition, by William D. Stevenson, Jr., McGraw-Hill Book Company, 1982. In FIG. 1, each horizontal line whose ends are unconnected is a bus, identified by the character B. The buses are interconnected in a desired manner by tie lines L. Certain ones of lines L contain a box Z representing the impedance of that tie line which must be taken into account in solving the load flow equation for the plant. In the case of the tie lines L which do not include a block Z, the impedances of these tie lines need not be considered. Two of the tie lines L contain blocks ZT representing the impedances of transformers which are equipped with tap changers to control their transformation ratios.

Bus B2 is a reference bus connected to receive power from an outside utility. Each of buses B4, B6, B8 and B10 is connected to the output of a respective generator 12, 14, 16 and 18. Bus B20 is connected to supply power to a synchronous motor 22. The plant further includes controllable switches S which can be operated to modify the configuration of the plant. The arrows extending downwardly from certain buses represent plant loads. Finally, the plant is provided with a number of circuit breakers which are not illustrated since their precise locations are not material to the practice of the present invention.

The goal of this invention is to optimize the reactive power characteristic of such a plant, taking into account that the cost of operating such a plant is influenced by the amount of reactive power received from the external utility, the voltage deviations on various buses, the tie line power factors and the reactive power level associated with each machine in the plant.

Figure 2:
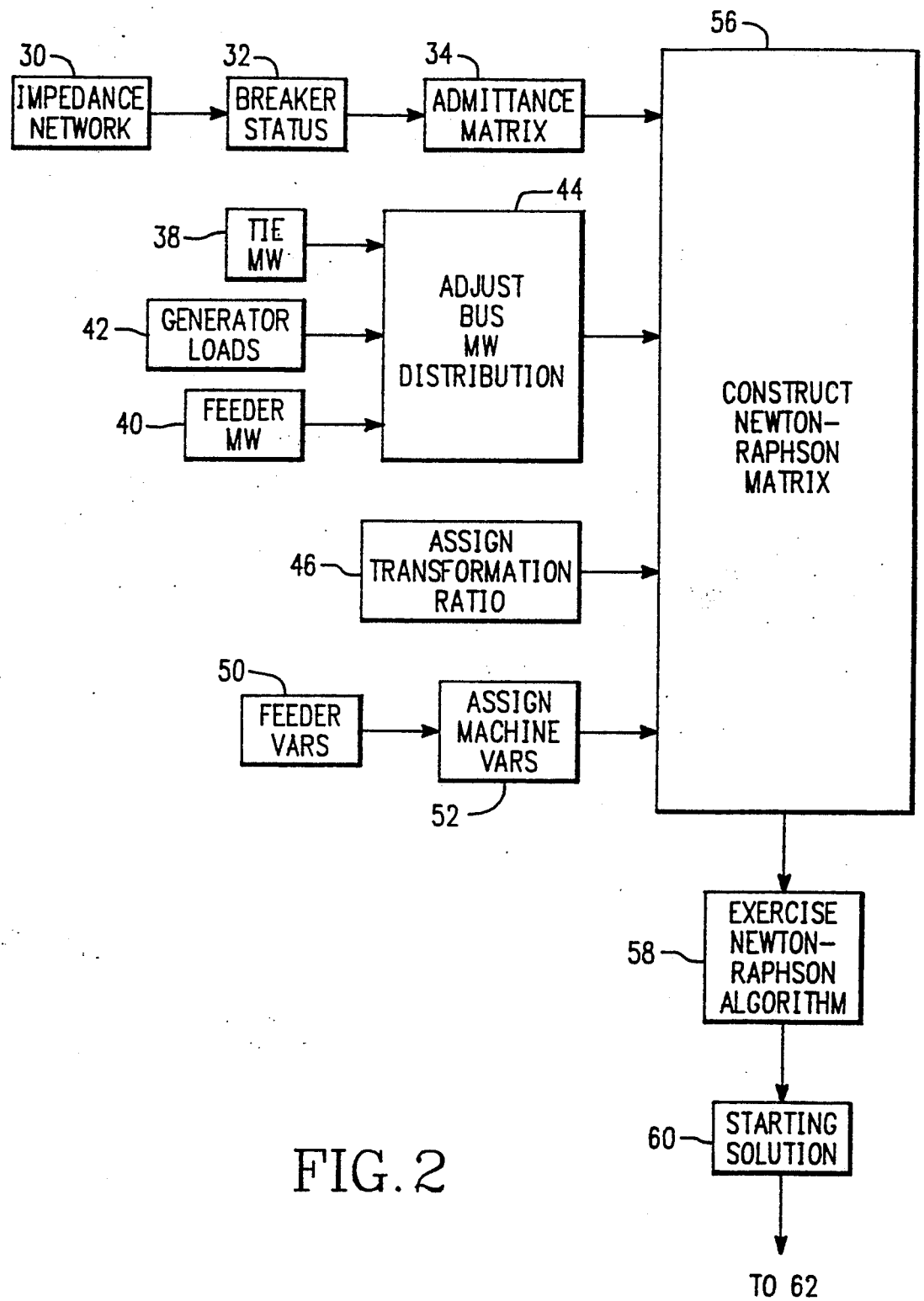
FIGS. 2 and 3 are flow diagrams illustrating an optimizing procedure according to the invention.
Figure 3:
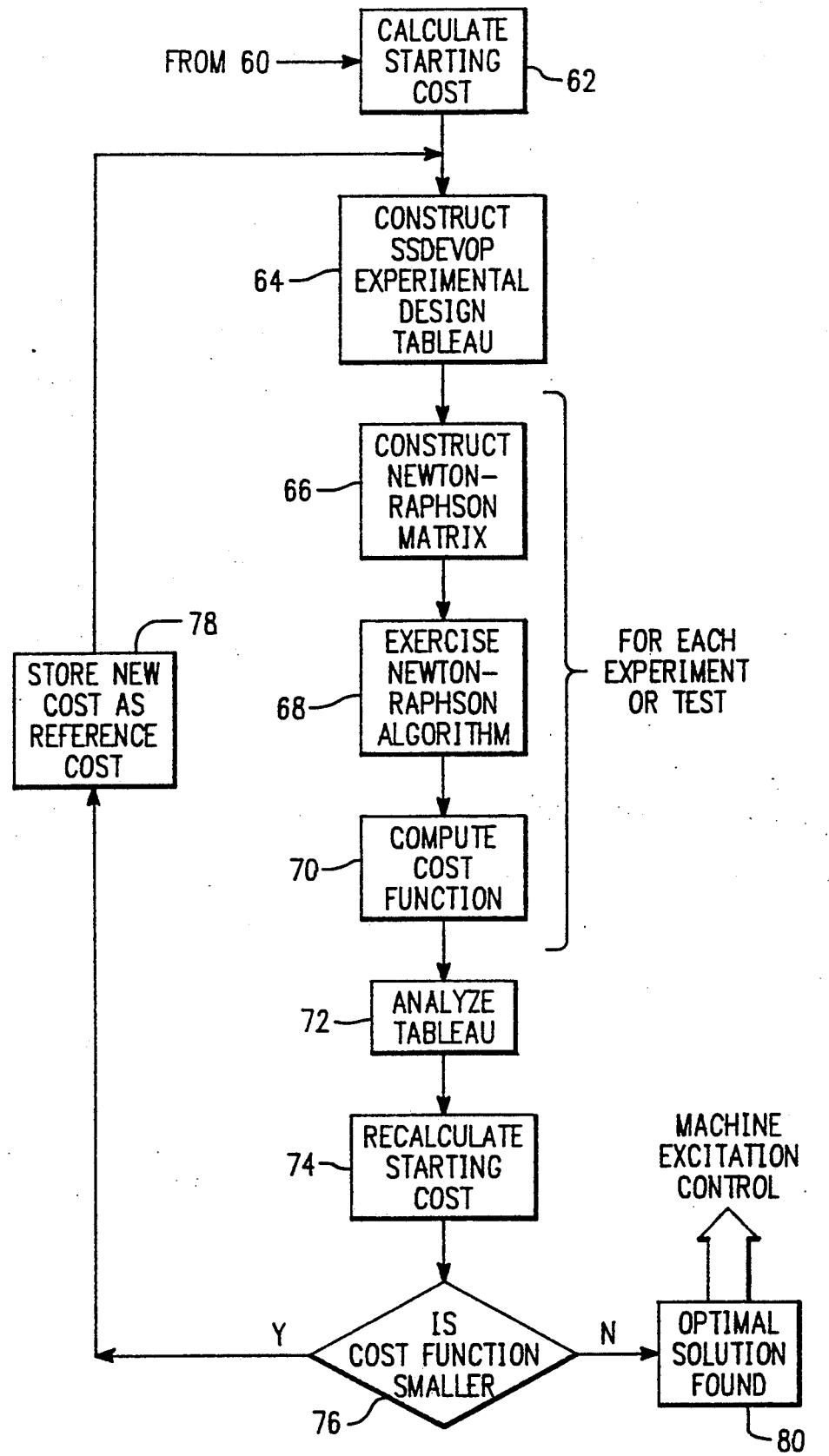

A system for implementing the invention is illustrated in the form of flow diagrams in FIGS. 2 and 3. FIG. 2 illustrates the procedure that will be employed to produce an initial assignment of generator and motor reactive powers to correspond to the reactive powers on the associated buses. In FIG. 2, function block 30 provides stored values for each impedance, Z and ZT, in the plant. This data is modified in a function block 32 which contains stored information identifying the operating status of each breaker and each switch S. For each breaker or switch that is opened, function block 32 assigns a very high impedance to the associated line. The resulting data is then employed in a function block 34 to establish an admittance matrix for the plant. The data provided by function block 30 is input by the computer operator from calculations based on measured values of the components in each tie line, or on the basis of impedance measurements after the plant has been assembled. An indication of the measured real power (hereinafter, real power will be identified by P and reactive power by Q) supplied by the external utility is provided by function block 38, and an indication of the measured P on each bus is supplied by function block 40. Indications of the assigned generator loads are provided by function block 42 which is constituted by a known program which assigns the P load for each generator on the basis of the total P which must be generated within the plant and the P received from the external utility. The value for P assigned to each machine represents an economic optimum, and these values represent fixed constraints on the variations which can be made by the system according to the present invention. The indications provided by function blocks 38, 40 and 42 are supplied to a function block 44 which adjusts the P distribution on the various buses accordingly.

Each of the transformers ZT is of a type having a variable transformation ratio. For example, each transformer may be a tap changing transformer having a plurality of tap positions each representing a given transformation ratio. An indication of an initially assigned transformation ratio for each transformer is provided by function block 46.

Indications of the initial Q on each bus, based on initial computations or measurements, are provided by a function block 50 and these indications are used, in function block 52, to assign a Q level to each generator and motor. Initially, the Q assigned to each machine can be the same as the indicated Q value for the bus to which that machine is connected.

The indications provided by function blocks 34, 44, 46 and 52 are supplied to a function block 56 in which a Newton-Raphson matrix is constructed and initialized. A Newton-Raphson matrix is a conventional tool employed for solving load-flow problems in a plant. The principals of the Newton-Raphson method, and its application to a power plant, are described in section 8.3 of the above-cited Stevenson text. Computer implementation of that method and the results which it can produce are described in sections 8.4, 8.5 and 8.6 of that text. Other sections of Chapter 8 of that text provide additional information of interest to this procedure.

As described in the above-cited text, the Newton-Raphson method can be employed to determine the voltage level at each bus and the power at the swing bus, normally bus B2, for specified values of P and Q at each of the other buses. This solution is performed in function block 58 and the results are supplied to function block 60 as starting values for the optimization procedure according to the present invention.

Referring now to FIG. 3, the data appearing in function block 60 is sent to a function block 62 which serves to initiate a cost calculation procedure. The procedure is based essentially on an evolutionary operation (EVOP) method described in articles by G.E.P. Box, entitled "Evolutionary Operation: A Method for Increasing Industrial Productivity", *APPLIED STATISTICS*, volume VI, no. 2, pages 3–23 (1957); and by G.E.P. Box and J. S. Hunter, "Condensed Calculations for Evolutionary Operation Programs", *TECHNOMETRICS*, volume 1, no. 1, pages 77–91 (1959). Procedures for automating this method are described by B. H. Carpenter and B. C. Sweeney in "Process Improvement with Simplex Self-Directing Evolutionary Operation", *CHEMICAL ENGINEERING*, pages 117–126, Jul. 5, 1965. It is this automated method which is employed, in modified form, herein.

Implementing these methods in the practice of the present invention, a starting cost is calculated, in function block 62, on the basis of the data supplied thereto, the cost being associated with deviations of various operating values from the desired value and weighting factors which reflect the relative importance, in terms of achieving the desired final result, of the deviation associated with each operating value. For example, a large weighting factor would be assigned to a deviation in the power factor at reference bus B2 from unity since such deviation directly influences the rate charged by the external utility. On the other hand, a lower weighting factor would be assigned to deviations in the voltages at the load buses from their design value.

The Newton-Raphson matrix determines bus voltages and tie line power needed to provide specified P and Q to each load. The matrix includes one equation for each bus and each equation can relate to net power from the bus or net current from each bus. In either form, solution of the set of equations provides values for the voltages at all buses and P and Q to the swing bus, normally bus B2.

In the matrix, the presence of a transformer will be represented by provision of a factor representing its per unit transformation ratio.

The values stored in function block 60 are also supplied to function block 64 where a simplex self-directing evolutionary operation (SSDEVOP, or EVOP for short) is constructed, followed by function blocks 66, 68, 70 and 72 where the operation is performed. The steps of this operation can be summarized as follows:

1) introducing a selected combination of small changes into the starting values of selected plant system variables;
2) solving the Newton-Raphson matrix for these variable values;
3) determining the costs associated with the solution;
4) selecting at least one new combination of small changes in the variable values, and performing steps 2) and 3) for these values;
5) comparing the costs determined in steps 3) and 4);
6) selecting new variable values on the basis of the result of step 5), performing steps 2) and 3) and comparing the cost result with certain costs employed in the previous comparison; and
7) repeating steps 1)–6) for successive new combinations of small changes until it can be concluded that the lowest possible cost has been at least approximately determined.

Step 1) is carried out in function block 64; step 2) is carried out in function blocks 66 and 68, which correspond to function blocks 56 and 58; step 3) is performed in function block 70; step 5) is performed in function block 72.

Each of the steps listed above will now be described in greater detail.

1. Selecting Variables

The present invention is concerned with optimizing the reactive power (Q) distribution in the plant, the active power (P) distribution being fixed by a separate procedure involving a known program. Thus, during the EVOP utilized in the practice of the present invention all P values are treated as constants.

The variables which are selected for optimizing are selected from among the reactive power produced by each generator, the reactive power produced by each motor and the transformation ratio of each adjustable transformer. Variation of the values of various groups of these variables can alter the reactive power distribution in the plant in a manner which influences the overall cost of plant operation.

During a given period of operation, certain of these variables will not be used. For example, the opening of circuit breakers may cause a generator and its load to be isolated, or "islanded", from the remainder of the plant. In that case, of course, the equation for that bus will be removed from the Newton-Raphson matrix. Further, it may be decided to maintain a fixed Q value for one or more generators or motors. These Q values will represent constants in the equation matrix.

For the plant illustrated in FIG. 1, there is a maximum of seven variables: Q for each generator and the single motor; and the transformation ratio for each of two transformers.

Changing Variable Values.

Starting from the current values of these variables as provided by function block 60, these values are perturbed in a certain pattern and after each perturbation the new values are employed to derive load flow solutions in the Newton-Raphson matrix. The efficiency of the EVOP procedure depends on the manner in which the values of the variables are changed. Specifically, it is considered advantageous to change each variable so that a complete set of perturbations produces combinations of variable values on which the current, or starting, values are centered.

The selection of perturbation values will be described below with reference to a system of two variables, depicted in the following Table:

| Case | Variable Value | |
|------|------|------|
|      | $X_1$ | $X_2$ |
| 1 | A − a | B − b |
| 2 | A + a | B − b |
| 3 | A | B + 2b |

A and B are the starting values of the two variables $X_1$ and $X_2$, and a and b are respective unit perturbation values. If $X_1$ and $X_2$ have different units, the values of a and b can be selected to correspond to similar reactive power changes.

Figure 4:
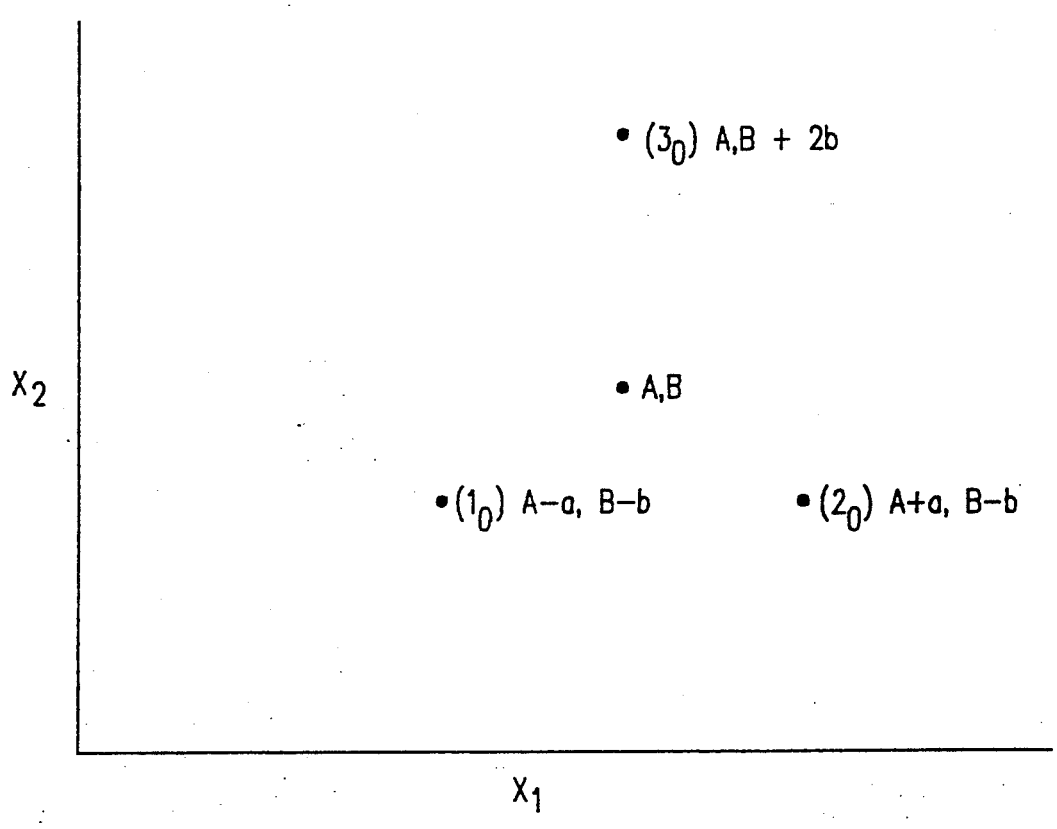
FIGS. 4 and 5 are diagrams illustrating the principle of evolutionary operation employed in the practice of the invention.

The relation of the complete set of perturbation cases to the starting values is shown in FIG. 4. This diagram clearly shows that the sets of values, or cases, provided in the above table are distributed uniformly around the current values A, B. If $X_1$ and $X_2$ have the same units, A, B is centered with respect to the three perturbed values of $$b = \frac{a}{\sqrt{3}}.$$

This principal can be applied to any selected number of variables by expanding the above table to the right. In each column (n), the first n entries would be identical and would be the starting value less the unit perturbation value, the (n+1)th entry would be the starting value plus n times the unit perturbation value, and all remaining entries would be the starting value of the respective variable.

If all variables have the same units, centering of the starting values relative to all n+1 cases requires that the unit perturbation value for variable n be equal to $a/\sqrt{n+1}$.

2. Solving the Newton-Raphson Matrix

This matrix is solved using the variable values for each case as fixed values. The result, for each case, will be a modified set of values for bus voltages and swing line power factor, as well as altered generator and motor power factors.

3. Cost Calculation

An equation defining the components of the cost of supplying power to all the loads is established. This equation can include values which do not correspond precisely to economic cost, such as changes in operating efficiency as bus voltage deviates from its nominal value and influence of level of Q on machine operation.

In the embodiment illustrated in FIG. 1, the essential cost factors would relate to deviation of reference bus (B2) power factor from unity; deviation of the voltage on each bus from its nominal value; deviation of each machine from a desired region of its reactive capability curve; transformers within their rated capacities; and transformer tap changers within their ranges. The cost calculation can ignore certain machines, e.g., motor 22 and one or more generators, if it is known that they will not significantly influence cost variations.

The cost associated with each factor corresponds to the product of a cost function and a weighting factor.

The cost function can be selected on the basis of the nature of the factor and the manner in which the value of that factor will influence cost.

By way of example, one cost function is simply the absolute value of the difference between the actual and ideal factor values. This cost function can be applied to the reference bus power factor, whose optimum value is unity, and to the reference bus and load bus voltage deviations.

A second type of cost function has a value of zero if the actual value of the factor is within a certain range and a non-zero value if the actual factor value is outside of that range. The non-zero value can be constant or proportional to the extent to which the value of the factor falls outside of the range. The last-mentioned function can be applied to the deviations of the selected machines from the desired region of the reactive capability curve. Preferably, this is automatically scaled so that maximum reaction power absorption has a value of −1 and maximum reaction power generation has a value of +1.

To take account of the transformer ratio range, the cost function assumes a value of 1 if the model indicates that the allowable transformer ratio range limit is exceeded.

Each weighting factor can reflect the economic cost associated with a respective cost function, or can reflect other considerations which are important to proper and safe operation of the plant. For example, if operation of a generator outside of a given range would destroy the generator, then the weighting factor should be such that the cost indicated for values outside of that range would be unacceptably high.

Exemplary values for these items are as follows, where x represents the actual factor value:

| Reference bus power factor: | |
|---|---|
| cost function = $\|1 - X\|$ | |
| weighting factor = 10 | |
| Load bus voltage deviation: | |
| cost function = $\|11 \text{ (kV)} - X\|$ | |
| weighting factor = 0.5 | |
| Machine reactive capability deviation: | |
| Factor Value | Cost Function |
| X < −0.95 | X − (−0.95) |
| X > 0.95 | X − 0.95 |
| −0.95 ≤ X ≤ 0.95 | 0 |
| Weighting factor = 1.0 | |

Weighting factors of 0.1 may be selected for the reference bus voltage deviation and 1 for the transformer ratio range.

Applying the selected cost functions and weighting factors to the designated factor values, a total cost amount is generated for each case. The relation between the cost amounts for the various cases is used to determine the next step in the optimizing process.

4. Selecting a New Set of Variable Values

Figure 5:
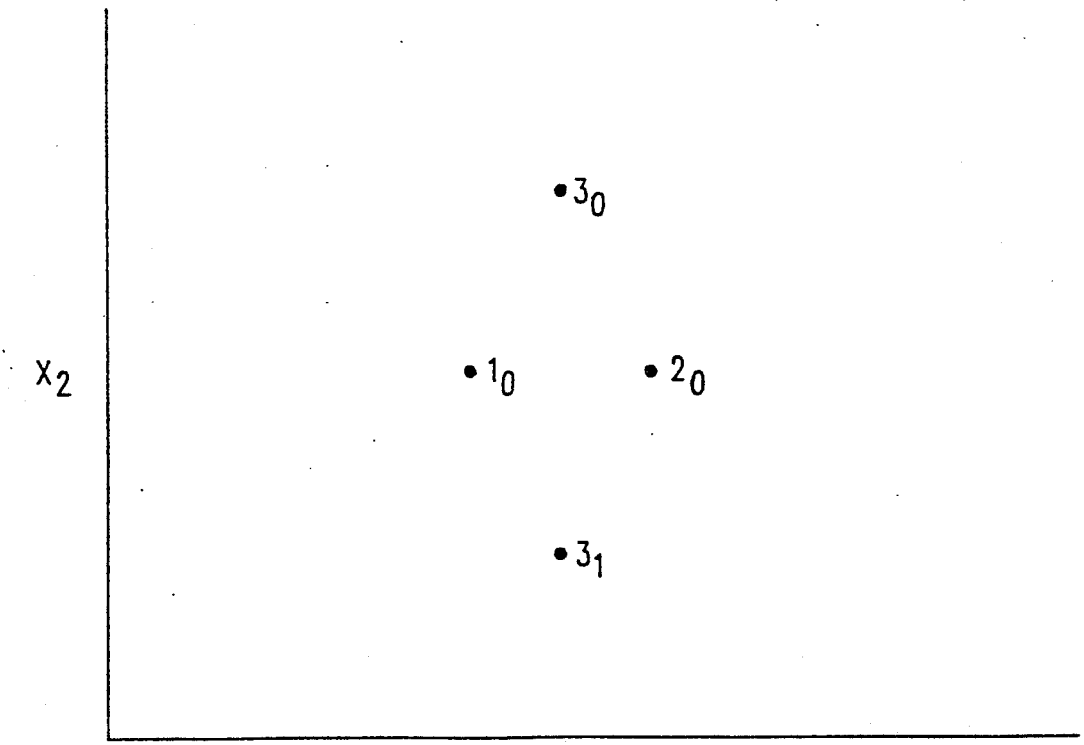

Referring to FIG. 5, which again relates to a two-variable problem, after the total cost has been determined for a first set of three cases, $1_o$, $2_o$, $3_o$, the highest cost value is identified and the point on the $X_1X_2$ plane representing that case is reflected about the mean of the other points. For example, if case $3_o$ represents the highest cost, the reflection of the associated point about the mean of points $1_o$ and $2_o$ would produce point $3_1$ (coordinates A, B-4b). The cost associated with new point $3_1$ is determined by solving the Newton-Raphson matrix for point $3_1$ and then computing the cost on the basis of the cost equation. If the cost associated with new point $3_1$ is lower than that of point $3_o$, points $1_o$, $2_o$ and $3_1$ constitute the new set, the highest cost point of the new set is reflected and the above comparison is repeated. If the cost associated with point $3_1$ is not lower than $3_o$, point $3_1$ is ignored and the selection of a new point is carried out by reflecting the next highest cost point about the mean of the other points.

This process continues until a point is reached at which none of the current points can be successfully reflected. At this time, the variable values of the best result obtained thus far are chosen as new starting values (A, B), the perturbation unit values are reduced and the entire EVOP is repeated until a cost value below a selected threshold is achieved or a selected computation time has elapsed. This procedure is represented by function blocks 74, 76 and 78.

One advantage of the above-described procedure is that after computation of cost for the first group of $n+1$ cases, each subsequent step requires computation for only one new point, until new starting values are chosen.

As noted above, the perturbation value associated with each variable of an EVOP simplex must decrease proceeding from one variable to the next toward the right. The smaller the perturbation magnitude, the smaller will be the influence of that perturbation on the resulting total cost indication. If a variable having a significant effect on the total cost is associated with a small perturbation value, the time required to reach the optimum cost value will be prolonged, and will possibly go beyond the time permitted for the optimizing procedure. This difficulty can be alleviated by varying the positions of the variables in the simplex, possibly in a random manner. This procedure will allow equalization of the influence of perturbations of each variable on the resulting total cost indication and will thus shorten the computation time required to arrive at the optimum cost value.

Once an optimization procedure has been completed and transformer taps and machine excitation currents have been set accordingly, a new optimization procedure may be triggered by the occurrence of: a change exceeding a given threshold in the absolute value of the total power load in the system; or a change exceeding a given threshold in the voltage of any phase of the main load buses; or a change in state of a switch or circuit breaker of the plant.

After an optimal solution has been found, as represented by function block 80, the excitation current values required to set the plant machines to produce or absorb the corresponding reactive power levels are indicated to an operator or supplied automatically to the machines.

Before undertaking initial solution of the Newton-Raphson matrix, a determination must be made of the identity of the circuit to be solved, taking into account that various circuit breakers may be open. Priority is given to an active circuit containing the reference bus, connected to the utility, and at least one generator operating under automatic reactive power control. If this condition does not exist, next priority is given to an active circuit containing at least two generators under automatic reactive power control. One generator is then treated as the swing bus. If neither condition is met, optimization cannot be performed.

Following selection of a circuit, all buses connected via lines of zero impedance are treated as a single bus.

For optimization, synchronous motors are treated as generators which generate negative real power. Since power readings providing inputs treat motors as loads, the sign of their power is automatically negated during on-line processing.

For the first iteration of the EVOP optimizing procedure according to the invention, all voltages are initialized to $1.0+j\,0.0$ per unit. For each subsequent iteration, the voltages associated with the lowest cost simplex vertex, or case, previously solved are used as the next starting point. Since this case is the one reflected least during successive iterations, this case will usually be closer than the other cases to the desired solution.

If, during optimization, a non-zero real power from the utility is specified, then after each iteration of the Newton-Raphson matrix, the swing power, i.e., the difference between the specified value and the computed value of the real power supplied by the utility, is distributed among all load buses in proportion to their real power loads. This allows the real power from the utility to be measured on-line. For off-line calculations, specifying zero real power from the utility will cause all calculated swing power to be attribute to the utility.

The system stores a representation of the reactive capability characteristic of each machine and these characteristics act as constraints on the reactive power which can be calculated for each machine.

While the description above refers to particular embodiments of the present invention, it will be understood that many modifications may be made without departing from the spirit thereof. The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

What is claimed:

1. A system for optimizing the costs associated with the generation and flow of reactive power in an industrial plant connected to receive power from an electrical power utility and including a plurality of electromechanical rotating machines and electrical loads connected in a network, each machine having a reactive power characteristic and an excitation element which is controllable for adjusting the reactive power generated or absorbed by the machine, said system comprising:
   means defining a model of the network for providing an indication of the quantity of reactive power to be supplied by the utility in dependence on representations of selected network electrical parameters including the reactive power generated or absorbed by each machine;
   cost determining means connected to said means defining a model for receiving the indication provided by the model and providing an indication of the cost associated with reactive power flow as represented by the model;
   network model parameter perturbing means connected to said model means for providing to said model means sets of representations of altered values of the quantity of reactive power generated or absorbed by each machine;

comparison means connected to said cost determining means for determining the lowest cost indication provided by said cost determining means after said model means have provided reactive power quantity indications relating to a plurality of sets of representations provided by said perturbing means; and machine control means connected to said comparison means and to the excitation element of at least one of the rotating machines for controlling the operation of the excitation element of the at least one machine to produce or absorb the amount of reactive power indicated by said model means with respect to the set of representations for which the lowest cost indication is produced by said cost determining means.

2. A system as defined in claim 1 wherein the plant includes a plurality of buses each connected to at least one of: the power utility; a rotating machine; and an electrical load, and the model has the form of a Newton-Raphson matrix which receives representations of selected values of the real and reactive power flow quantities from the utility, from each machine and to each load, and the model is operative for producing calculated values for the reactive power quantity to be produced or absorbed by each machine.

3. A system as defined in claim 2 wherein the plant further has at least one transformer having an adjustable transformation ratio, and said means defining a model is further operative for producing a calculated value for the transformer transformation ratio.

4. A system as defined in claim 3 wherein said perturbing means are operative to perform an evolutionary operation optimizing procedure.

5. A system as defined in claim 4 wherein said perturbing means are operative to additionally provide, in each set of representations, a selected altered value of the transformation ratio of the transformer.

6. A system as defined in claim 5 wherein the representations for which altered values are provided by said perturbing means have the form of an ordered array of representations, each representation is altered by an amount which decreases progressively from one representation in the array to the next, and said perturbing means are operative to periodically change the order of representations in the array.

7. A system as defined in claim 6 wherein said perturbing means are operative to change the order of representations in the array in at least an approximately random manner.

8. A system as defined in claim 1 wherein said machine control means are connected to said excitation element of each machine for controlling the operation of the excitation element of each machine.

9. A method for optimizing the costs associated with the generation and flow of reactive power in an industrial plant connected to receive power from an electrical power utility and including a plurality of electromechanical rotating machines and electrical loads connected in a network, each machine having a reactive power characteristic and an excitation element which is controllable for adjusting the reactive power generated or absorbed by the machine, said method comprising:

creating a model of the network for providing an indication of the quantity of reactive power to be supplied by the utility in dependence on representations of selected network electrical parameters including the reactive power generated or absorbed by each machine;

providing an indication of the cost associated with reactive power flow as represented by the model;

providing to the model sets of representations of altered values of the quantity of reactive power generated or absorbed by each machine and causing the model to produce an indication for each set of representations;

determining the lowest cost indication provided after the model has provided indications relating to a plurality of different sets of representations provided to the model; and controlling the excitation element of at least one of the machines to produce or absorb the amount of reactive power indicated by the model with respect to the set of representations for which the lowest cost reactive power quantity indication is produced in said determining step.

10. A method as defined in claim 9 wherein said step of controlling is carried out to control the excitation element of each machine.

* * * * *